Figure 1:
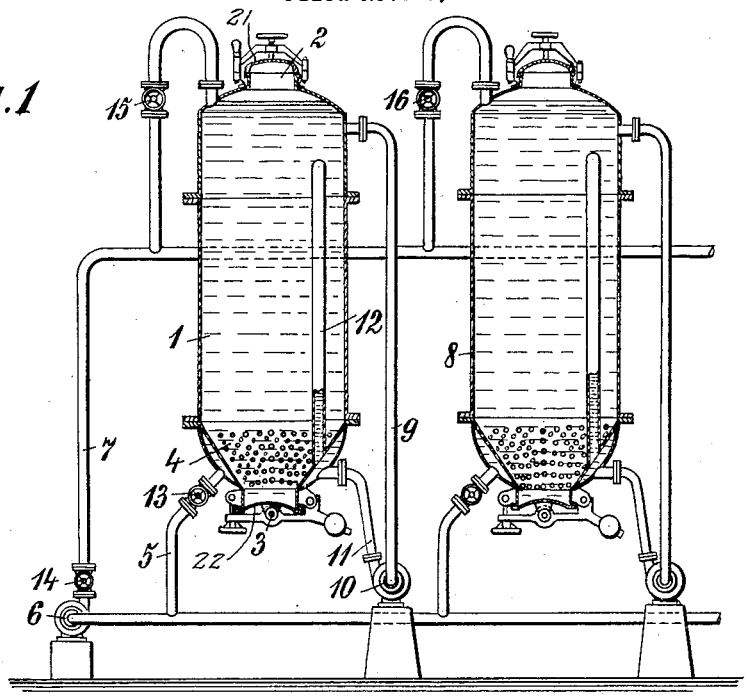

May 24, 1932.  W. BUSS  1,859,497
EXTRACTOR
Filed Nov. 7, 1927  2 Sheets-Sheet 1

Inventor
WALTER BUSS

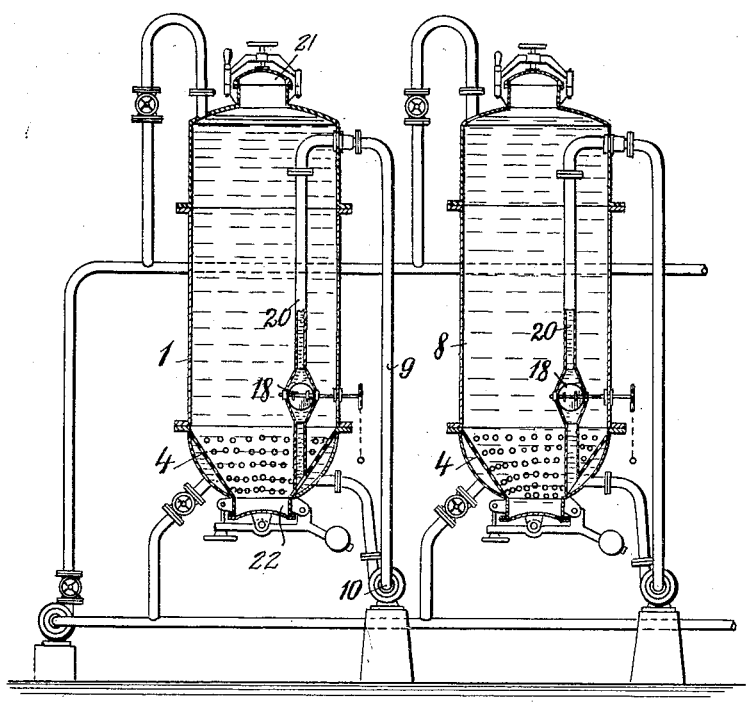

Patented May 24, 1932

1,859,497

UNITED STATES PATENT OFFICE

WALTER BUSS, OF BASEL, SWITZERLAND, ASSIGNOR TO BUSS AKTIENGESELLSCHAFT, OF BASEL, SWITZERLAND, A CORPORATION OF SWITZERLAND

EXTRACTOR

Application filed November 7, 1927, Serial No. 231,657, and in Germany November 12, 1926.

My invention relates to improvements in extractors, such as are used for example for obtaining tanning material or dye-stuffs from wood or bark and fruits and the like. In extractors of this type the raw material is acted upon in a disintegrated state by hot water, so that a more or less concentrated solution of tanning material is obtained. For bringing the liquid into contact with the raw material the said liquid is moved through the extractor by means of a pump, until it has the desired degree of concentration, and thereafter it is removed by a special pump from the said extractor and conveyed into another apparatus, the liquid being removed from the bottom part of the extractor and through a strainer provided near the bottom. In apparatus such as are now in use the dimension of the strainer is comparatively small, so that much time is needed for removing the liquid from one extractor and conveying the same to another apparatus.

The object of the improvements is to provide an extractor of the class referred to in which the liquid can be speedily removed from the extractor, and with this object in view my invention consists in providing one or more tubular strainer or filtering members extending through the inner part of the extractor. By means of the said tubular member or members the liquid is not removed only from the bottom part of the extractor but all over the height thereof, and by providing the said tubular member or members the effective area of the strainer or filtering member is considerably increased.

A rapid operation of the extractor is important for the reason that ordinarily a single pump is provided for removing the liquid from a large number of extractors, so that the said pump must be able to empty one extractor within a limited period of time in order to be ready for being connected with another extractor.

Another object of the improvements is to provide an extractor in which the liquid is not drawn only from the same part of the charge of the extractor. By the rising concentration of the liquid the specific gravity thereof is varied, and the upper parts of the liquid have a lower degree of concentration than the lower layers. Therefore, the pump used for moving the liquid through the extractor takes in by suction only the parts of the liquid of lower concentration, and it is necessary frequently to operate the pump for driving the liquid through the extractor, and much time is need for obtaining the desired degree of concentration. In my improved apparatus the aforesaid tubular filtering member or members are connected at their top ends to the suction pipe of the pump provided for driving the liquid through the extractor, and the said filtering member is adapted to be closed at its bottom by a gate or valve which is closed when operating the pump for driving the liquid through the extractor, and which is opened when removing the liquid from the extractor and conveying the same to another apparatus. Therefore, while operating the pump for driving the liquid through the extractor the liquid is uniformly drawn by suction from the whole body of the liquid, so that a liquid of uniform concentration is obtained, and much time is saved for the reason that the flow of the liquid is made more energetic, and the degree of concentration of the liquid is uniform.

Other objects of the improvements will appear from the following description.

For the purpose of explaining the invention several examples embodying the same have been shown in the accompanying drawings, in which the same letters of reference have been used in all the views to indicate corresponding parts. In said drawings, Fig. 1 is a sectional elevation showing two cooperating extractors, and Figs. 2 and 3 are similar elevations showing other modifications.

Figure 2:
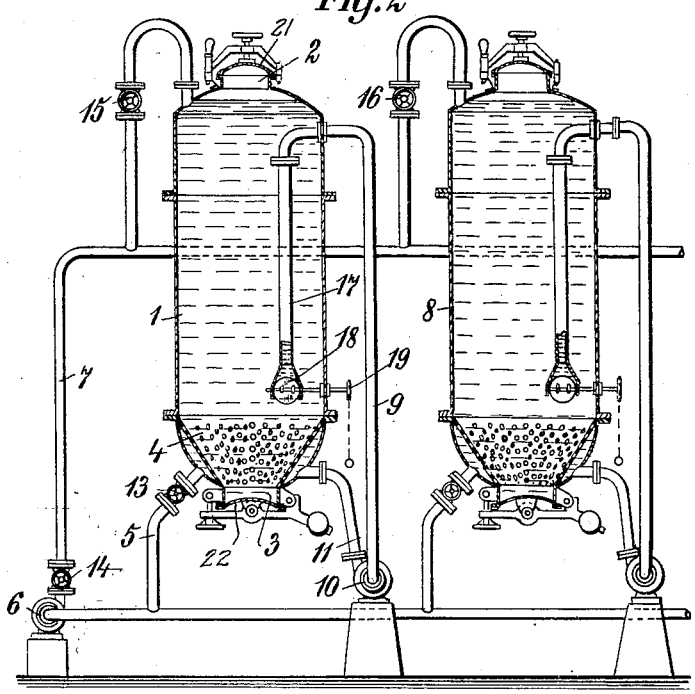

In the example shown in Fig. 1 the extractor comprises a receptacle 1 which is provided at its top and bottom with tubular extensions 2 and 3 adapted to be closed by lids 21 and 22, the extension 2 being provided for charging the extractor with the raw material, and the extension 3 being provided for removing the raw material. At the bottom part of the extractor there is a conical strainer or filtering member 4. Below the said strainer the suction pipe 5 of a pump 6 is connected to the receptacle, which pump is designed for removing the liquid from the extractor 1 and conveying the same through a pipe 7 to another extractor 8, the said pipe 7 including valves 14 and 16. A branch pipe 23 including a valve 15 is connected with the top part of the extractor. To the top part of the extractor the suction pipe 9 of a pump 10 is connected, the pressure pipe 11 of which is connected with the bottom part of the extractor 1, the object of the said pump being to circulate the liquid through the extractor 1. From the strainer 4 a tubular strainer or filtering member 12 rises substantially through the whole height of the extractor, and the said tubular member is closed at its top and opens at its bottom into the portion of the extractor located below the strainer 4 and communicating with the pipes 9 and 11. The tubular strainer 12 is adapted to supplement the filtering action of the strainer 4 by filtering the liquid at points lengthwise of the extractor; in other words, said tubular strainers 12 constitute additions whereby the filtering areas through which the liquid passes is increased.

The operation of the apparatus is as follows:

For circulating the liquid through the extractor 1 the pump 10 is operated, so that the liquid is taken from the top part and delivered into the bottom part of the extractor. When the liquid has the desired degree of concentration the pump 10 is stopped, the valves 13, 14 and 16 are opened, the pump 6 is started and the valve 15 is closed. Now the pump 6 takes the concentrated liquid from the bottom part of the extractor and conveys the same to the second extractor 8. Now the liquid is not filtered only by means of the strainer 4, but also by means of the tubular strainer 12. Thus the filtering area is increased, and the liquid is withdrawn not only from the bottom part of the extractor but also from the top part thereof, the liquid passing through the top part of the tubular strainer 12 flowing downwardly through the said strainer and to the pipe 5. Thus the extractor is emptied within a comparatively short period of time.

In the modification shown in Fig. 2, the tubular strainer 17 corresponding to the strainer 12 is connected at its top to the suction pipe 9 of the circulating pump 10, and its bottom end is located a little above the strainer 4, and it is disconnected from the said strainer. Further, the said pipe is adapted to be closed at its bottom end by a gate 18 hinged to the tubular strainer and adapted to be opened and closed from the outside of the extractor by means of a stem 19.

The operation of the extractor is as follows:

The liquid is removed from the extractor 1 and conveyed to the extractor 8 in the same way as has been described with reference to Fig. 1, the gate 18 being set into position for opening the tubular strainer 17. Now the function of the said tubular strainer 17 is the same as that of the member 12 shown in Fig. 1, the space between the bottom part of the said member 17 and the strainer 4 being practically immaterial, because the liquid collected within the member 17 flows to the strainer 4.

When circulating the liquid through the extractor the gate 18 is closed. Now the circulating pump 10 takes the liquid from the tubular strainer 17, and it forces the same to the bottom part of the extractor and below the strainer 4. Thus the tubular strainer 17 has the function first to accelerate the operation of removing the liquid from the extractor 1 and conveying the same to the extractor 8, and second to permit the liquid to be taken by the circulating pump from different parts of the extractor.

In the examples so far described the tubular strainers 12 and 17 have the function to accelerate the circulating operation as well as the operation of removing the liquid. But in the construction shown in Fig. 2 in which the pipe 17 is not directly connected with the strainer 4 the operation of removing the liquid is not accelerated in the same way as the circulating operation. On the other hand, in the example shown in Fig. 1 the operation of circulating the liquid is not accelerated in the same way as the operation of removing the liquid, because the top part of the tubular strainer 12 is not connected with the suction pipe 9. In Fig. 3 I have shown a modification in which both operations are accelerated in the same way.

The general construction of the said apparatus with respect to the extractors and associated elements, the pipe connections, and the pumps, is the same as that described with reference to Figs. 1 and 2, and the same letters of reference have been used to indicate similar parts. But the tubular strainer 20 corresponding to the strainers 12 and 17 is connected at its bottom with the strainer 4, and it opens through the said strainer to the bottom part of the extractor 1 located below the said strainer. At its top the said tubular strainer is connected with the suction pipe 9 of the circulating pump 10. Near the bottom part of the tubular strainer 20 there is a valve or gate 18 by means of which the said strainer can be opened and closed from the outside of the apparatus. The operations of circulating and removing the liquid are the same as has been described with reference to Fig. 2, the gate 18 being opened when removing the liquid from the extractor and closed when circulating the liquid.

The tubular strainer 20 being connected both to the suction pipe 9 and to the bottom strainer 4, the liquid can be taken from the top parts of the charge and flow to the bottom part of the extractor when operating the pump 6 for removing the liquid, so that the filtering area is materially increased. Further, when operating the circulating pump the liquid can be taken not only from the top part of the extractor but also from the bottom part thereof, so that the circulating operation is likewise effective.

In all the examples each extractor is provided with a single tubular strainer. But I wish it to be understood that I do not limit myself to this feature.

I claim:

1. Apparatus for making extracts or infusions by steeping, comprising a container, a tubular strainer extending lengthwise of said container, a liquid circulating pump, a connection from the suction side of said pump to the upper end of said tubular strainer, a connection from the pressure side of said pump to said container, and a valve in said tubular strainer.

2. An apparatus for making extracts or infusions by steeping, comprising a plurality of containers arranged for passing the liquid therethrough in series, a strainer in each of said containers at the lower part thereof, a tubular strainer extending lengthwise of each of said containers and having no connection with said lower strainers, a valve at the lower end of each of said tubular strainers, and pumps for circulating liquid through each of said containers and having their pressure sides connected with said containers and their suction sides connected with the upper ends of said tubular strainers.

3. Apparatus for making extracts or infusions by steeping, comprising a plurality of containers, straining means within each of said containers, circulating pumps connected individually with said containers for circulating liquids therein, a single transfer pump common to all of said containers and having its suction side connected with each of said containers at the bottom and its pressure side connected with each container at the top, and valves in said connections for controlling the same.

4. Apparatus for making extracts or infusions by steeping, comprising a container, a conical screen at the lower end of said container converging downwardly, a tubular strainer within said container extending lengthwise thereof, a liquid circulating pump, a connection leading from the suction side of said pump to the upper end of said container, and a connection leading from the pressure side of said pump to the lower end of said container below said conical screen.

5. Apparatus for making extracts of infusions by steeping, comprising a container, a conical screen at the lower end of said container converging downwardly, a tubular strainer within said container extending upwardly from said conical screen and having its upper end closed, a liquid circulating pump, a connection from the suction side of said pump communicating with the interior upper end of said container, and a connection from the pressure side of said pump communicating with the interior lower end of said container below said conical screen.

In testimony whereof, I hereunto affix my signature.

WALTER BUSS.